(12) United States Patent
P et al.

(10) Patent No.: US 10,353,750 B2
(45) Date of Patent: Jul. 16, 2019

(54) DISCOVERY AND EXPOSURE OF TRANSACTIONAL MIDDLEWARE SERVER-BASED APPLICATIONS AS CONSUMABLE SERVICE ENDPOINTS

(71) Applicant: International Business Machines Corporation, Armonk, NY (US)

(72) Inventors: Gopalakrishnan P, Bangalore (IN); Kishor S. Kulkarni, Karnataka (IN); Sreejith Nalamvathukkal, Bangalore (IN); Hariharan N. Venkitachalam, Karnataka (IN)

(73) Assignee: International Business Machines, Armonk, NY (US)

( * ) Notice: Subject to any disclaimer, the term of this patent is extended or adjusted under 35 U.S.C. 154(b) by 102 days.

(21) Appl. No.: 15/449,168

(22) Filed: Mar. 3, 2017

(65) Prior Publication Data

US 2018/0253342 A1    Sep. 6, 2018

(51) Int. Cl.
    *G06F 9/54*    (2006.01)
(52) U.S. Cl.
    CPC .................................. *G06F 9/541* (2013.01)
(58) Field of Classification Search
    CPC ........................... G06F 9/541; G06F 2209/547
    See application file for complete search history.

(56) References Cited

U.S. PATENT DOCUMENTS

| 2014/0033190 | A1  |  1/2014 | Fu et al.  |              |
|--------------|-----|---------|------------|--------------|
| 2015/0242191 | A1* |  8/2015 | Harman     | G06F 17/30   |
|              |     |         |            | 717/143      |
| 2016/0370775 | A1* | 12/2016 | Daugherty  | G05B 15/02   |
| 2016/0378439 | A1* | 12/2016 | Straub     | G06F 8/34    |
|              |     |         |            | 717/107      |

OTHER PUBLICATIONS

Amel Bennaceur, Gordon Blair, Nikolaos Georgantas, Paul Grace, Paola Inverardi, et al.. Revisiting the Middleware Paradigm: On-the-fly Interoperability in Highly Complex Distributed Systems. [Research Report] 2010. <inria-00512440>.

* cited by examiner

*Primary Examiner* — Charles E Anya
(74) *Attorney, Agent, or Firm* — Patterson + Sheridan, LLP

(57) ABSTRACT

The present disclosure relates to techniques for discovering and exposing middleware applications as service endpoints through a universal connector in a middleware-agnostic fashion that does not require additional coding. In one embodiment, a back-end middleware system identifies a set of middleware applications that operate on an input/output (I/O) data area. Next, the back-end middleware system generates a set of discovery artifacts describing the middleware applications and the I/O data area. A discovery client sends a discovery request to a the back-end middleware system, which sends structured information from the discovery artifacts in response. Based on the structured information, the discovery client creates a REST model for the set of middleware applications, mapper artifacts that map REST operations to the middleware applications, and transformer artifacts that indicate how to convert data between Javascript-object-notation (JSON) format and format that is compatible with the I/O data area.

20 Claims, 6 Drawing Sheets

DISCOVERY AND EXPOSURE OF TRANSACTIONAL MIDDLEWARE SERVER-BASED APPLICATIONS AS CONSUMABLE SERVICE ENDPOINTS

BACKGROUND

In general, enterprise application software (EAS) refers to software generally used by organizations (e.g., businesses, governments, schools) rather than individual consumers. Many enterprise applications are highly complex and include multiple, independent software components. Enterprise applications can also be deployed on a variety of platforms across networks, intranets, or the Internet. Since they often serve the interests of large corporations and governments, enterprise applications typically meet stringent requirements for security, performance, and scalability.

Often, enterprise applications (e.g., software for supply-chain management, enterprise resource planning (ERP), customer relationship management (CRM), and payroll management) are not designed to communicate directly with each other without some type of middleware. This is partly because enterprise applications may run on different operating systems, use different database schemes, or be coded in different programming languages. Some applications may also be traditional systems that were not designed to work with other applications in a distributed network environment. When the enterprise applications an organization uses have no way of readily communicating with each other, inefficiencies can result. For example, multiple copies of the same data may be stored in different locations and some processes may be difficult to automate. If an unstructured approach is used to integrate these applications, a thicket of ad hoc dependencies can arise and result in complex systems that are difficult to manage and maintain.

Enterprise application integration (EAI) refers to the process of linking such applications together in a structured fashion to facilitate communication and overall efficiency without causing unmanageable complexity. Application programming interfaces (APIs) are one way enterprise applications can communicate with each other. APIs generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, by using a Representational State Transfer function call (a REST call), queries in an HTTP POST request, a Simple Object Access Protocol (SOAP) request, or other protocols that allow client software to invoke functions on a remote system.

Customer Information Control System (CICS) refers to a class of mixed-language application servers that provide online transaction management and connectivity for applications. CICS is middleware that facilitates fast, high-volume processing for online transactions. Online transaction processing (OLTP) refers to a type of information systems that facilitate and manage transaction-oriented applications, typically for data entry and retrieval transaction processing. A type of object called a "data area" holds data to be accessed by a job running on a system. A data area is used to pass data from one program to another. In CICS, the communications area (COMMAREA) is one example of a data area. Alternatively, a construct called a "channel" is another type of data area for passing information between programs. A channel is a group of named data blocks referred to as "containers."

Transactional Middleware refers to the software that supports the execution of electronic transactions in a distributed setting. Transaction Processing Monitors (TPM) such as CICS are one type of transactional middleware. TPMs run transactions in a way that makes it appear as though distributed operations are executed atomically (i.e., by ensuring that groups of operations are executed in their entirety or not all). This adds a layer of abstraction that makes complex systems easier to design for programmers.

SUMMARY

One embodiment disclosed herein includes a method for discovering and exposing middleware applications as service endpoints. The method generally includes sending a discovery request to a middleware discovery service to discover a set of middleware applications to be prepared for representational state transfer (REST) accessibility; receiving, in response to the discovery request, structured information that describes the set of middleware applications and describes properties of an I/O data area on which the middleware applications operate; creating, based on the structured information, a REST model for the set of middleware applications, wherein the REST model specifies the properties of the I/O data area; creating, based on the structured information, mapper artifacts that map REST operations to middleware applications in the set; and creating, based on the structured information, transformer artifacts that indicate how to convert data between Javascript-object-notation (JSON) format and a second format, wherein the second format is compatible with the I/O data area.

Another embodiment includes non-transitory computer-readable storage medium containing instructions that, when executed by one or more processors, perform an operation for discovering and exposing middleware applications as service endpoints. The operation generally includes sending a discovery request to a middleware discovery service to discover a set of middleware applications to be prepared for representational state transfer (REST) accessibility; receiving, in response to the discovery request, structured information that describes the set of middleware applications and describes properties of an I/O data area on which the middleware applications operate; creating, based on the structured information, a REST model for the set of middleware applications, wherein the REST model specifies the properties of the I/O data area; creating, based on the structured information, mapper artifacts that map REST operations to middleware applications in the set; and creating, based on the structured information, transformer artifacts that indicate how to convert data between Javascript-object-notation (JSON) format and a second format, wherein the second format is compatible with the I/O data area.

Still another embodiment includes one or more processors and memory storing one or more applications that, when executed on the one or more processors, perform an operation for discovering and exposing middleware applications as service endpoints. The operation generally includes sending a discovery request to a middleware discovery service to discover a set of middleware applications to be prepared for representational state transfer (REST) accessibility; receiving, in response to the discovery request, structured information that describes the set of middleware applications and describes properties of an I/O data area on which the middleware applications operate; creating, based on the structured information, a REST model for the set of middleware applications, wherein the REST model specifies the properties of the I/O data area; creating, based on the structured information, mapper artifacts that map REST operations to middleware applications in the set; and creating, based on the structured information, transformer artifacts that indicate how to convert data between Javascript-object-notation (JSON) format and a second format, wherein the second format is compatible with the I/O data area.

DETAILED DESCRIPTION

Figure 1:
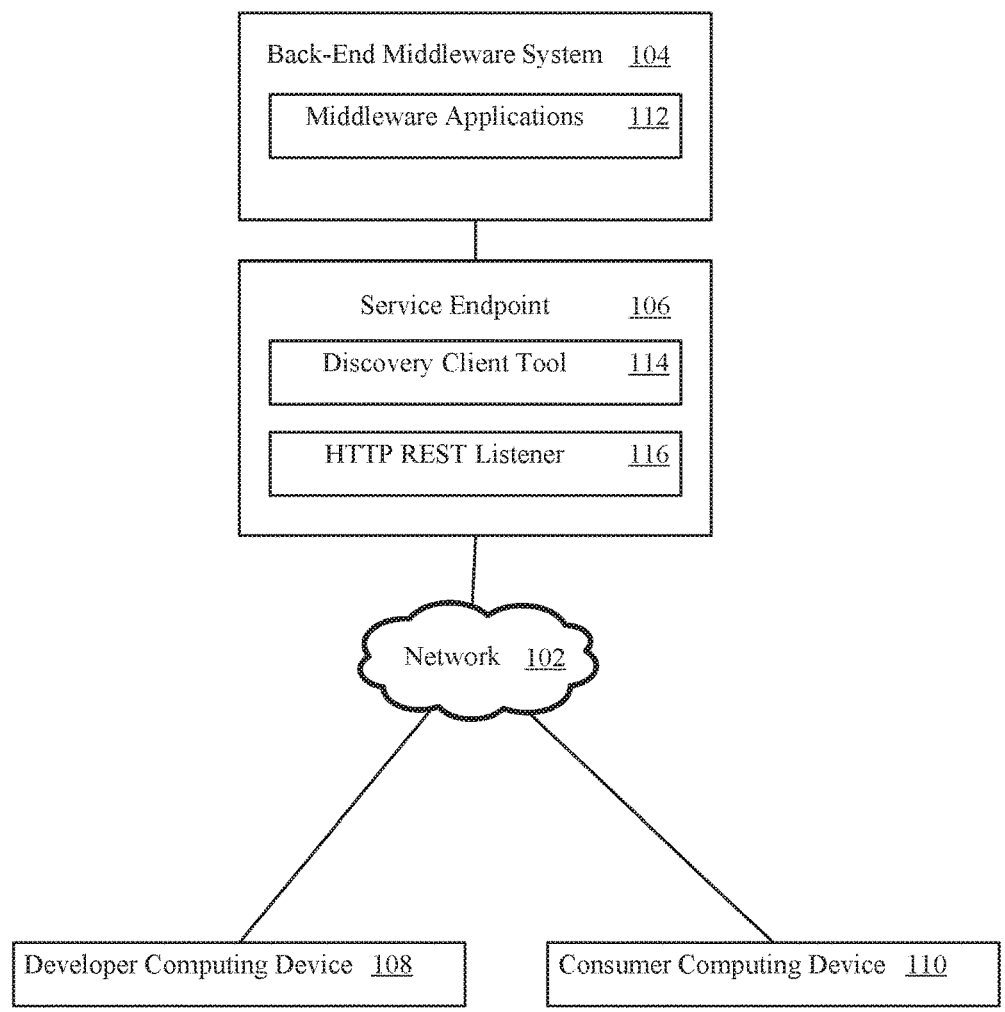
FIG. 1 illustrates a computing environment in which embodiments of the present disclosure operate, according to one embodiment.

Embodiments presented herein describe techniques for discovering and exposing middleware applications as service endpoints in a middleware-agnostic fashion that does not require additional coding. For example, in one embodiment, a back-end middleware system first identifies a set of middleware applications that operate on an input/output (I/O) data area. In many middleware systems, an input/output (I/O) data area is described using a C structure definition or a COBOL copy book for C and the COBOL programming language. The input/output (I/O) data area allows clients and transactional middleware applications to exchange data. The back-end middleware system associates a logical-resource name with the set of applications.

Next, the back-end middleware system generates a set of discovery artifacts. The discovery artifacts describe the middleware applications and describe properties of the I/O data area. For example, the discovery artifacts can specify an applicable resource name, a copybook or structure used to define the I/O data area, the programming languages in which the middleware applications are written, endianness information, and copybook or structure data alignment information for COBOL and C applications. Once the discovery artifacts have been generated, the back-end middleware system activates a discovery service configured to receive discovery requests for information encoded in the artifacts.

Next, a discovery client sends a discovery request to the middleware discovery service. In response, the discovery service reads the discovery artifacts and sends data contained therein as structured information in a format the client can understand. The discovery client receives the structured information and creates a REST model for the set of middleware applications. The REST model is based on the structured information and specifies the properties of the I/O data area. In addition, the discovery client creates mapper artifacts (e.g., mappings) based on the structured information. The mapper artifacts map REST operations to middleware applications in the set. The discovery client also creates transformer artifacts based on the structured information. The transformer artifacts indicate how to convert data between Javascript-object-notation (JSON) format and a second format that is compatible with the I/O data area. Once the REST model, the mapper artifacts, and the transformer artifacts have been created, the discovery client is ready to expose the set of middleware applications for use.

A REST listener at the discovery client receives an API call. A universal TPM connector at the discovery client identifies a REST operation requested by the API call and applies the mapper artifacts to determine a subset of the middleware applications to which the REST operation maps. The universal TPM connector transforms input data included in the API call from JSON format to the second format by applying the transformer artifacts and sends a message including the transformed input data to a middleware listener service in the back-end middleware system for the subset of the middleware applications.

At the back-end middleware service, the subset of middleware applications performs the requested REST operation based the transformed input data. The back-end middleware service sends response data resulting from the performance of the REST operation to the universal TPM connector. The universal TPM connector transforms the response data from the second format to JSON format by applying the transformer artifacts and sends the transformed response data in reply to the API call.

Many modern organizations use traditional enterprise applications written in programming languages such as Common Business-Oriented Language (COBOL), C/C++, and Programming Language One (PL/I). Many of these enterprise applications are deployed in a transactional processing system or a middleware environment. Typically, such applications are accessed through terminals (e.g., green screens), web-based interfaces, Transmission Control Protocol/Internet Protocol (TCP/IP) sockets, or inter system communication facilities provided by middleware. These existing enterprise applications typically interface with each other by using data areas (i.e., objects used to hold data for access by a job running on a system).

These existing enterprise applications could provide more value if they were readily accessible as services or APIs (e.g., as service endpoints). Such services or APIs could be used internally in business-to-employee (B2E) scenarios or externally by clients or vendors in business-to-consumer (B2C) scenarios. Current solutions for exposing existing enterprise applications as APIs or services, however, have a number of problems. First, current solutions lack a way to automatically discover existing applications that are suitable to be offered as services or APIs. Furthermore, current solutions typically require programmers to understand the existing interfaces for the applications and restructure existing application code. Also, current solutions are typically implemented in a middleware-specific fashion and are not portable to other types of middleware.

Embodiments of the present disclosure allow for traditional middleware applications (e.g., written in C/C++, COBOL, and PL/I) that are interfaced via a data area to be exposed as service endpoints and to be accessed via a RESTful interface or a web service without requiring programmers to do additional coding or to understand existing interfaces of the applications. Furthermore, embodiments of the present disclosure are middleware agnostic and can therefore be used with different types of middleware without requiring modification. While embodiments discussed herein are described in terms of service endpoints associated with a RESTful interface, the methods of the present disclosure can be readily adapted for other types of service access (e.g., web services).

Clients normally invoke traditional transactional applications (e.g., developed using C or COBOL) by passing a data area that is used to exchange data between clients and transactional server programs or other transactional applications. The data area is a programming construct that holds data to be accessed by transactional applications as part of a job.

In one example, the Customer Information Control System (CICS) can use a data area called a Communication Area (COMMAREA) for Online Transaction Processing (OLTP) in the International Business Machines (IBM) transaction (TX) Series for multiplatforms. The IBM TXSeries for multiplatforms is one example type of distributed transaction-processing middleware. Alternatively, the CICS can use a channel as a data area for passing information between programs. A channel is a group of named data blocks referred to as "containers." Other middleware products use similar constructs for used for data exchange between clients and transactional-based server programs (or other transactional-based applications).

Embodiments presented herein describe how to discover input/output (I/O) data-area-based applications that are deployed on transactional middleware automatically from REST-based clients and how to invoke those applications from REST-based clients.

FIG. 1 illustrates a computing environment 100, according to one embodiment. As shown, a back-end middleware system 104 includes middleware applications 112 accessed through terminals and written in programming languages such as COBOL, C, C++, and PL/I. A service endpoint 106 includes discovery client tool 114. Discovery client tool 114 allows a developer working at the developer computing device 108 to discover the middleware applications 112 that the service endpoint 106 can make available for use. After discovery client tool 114 has discovered the middleware applications 112, the Hypertext transfer protocol (HTTP) REST listener 116 exposes middleware applications 112 as REST services. A user at the consumer computing device 110 sends a request for the middleware applications 112 to the HTTP REST listener 116. The request specifies a transaction to be performed. The HTTP REST listener 116 maps the request to the middleware applications 112 and transforms the request into a format that can be read by the middleware applications 112. The service endpoint 106 then communicates with the back-end middleware system 104 to invoke the transaction.

Figure 2:
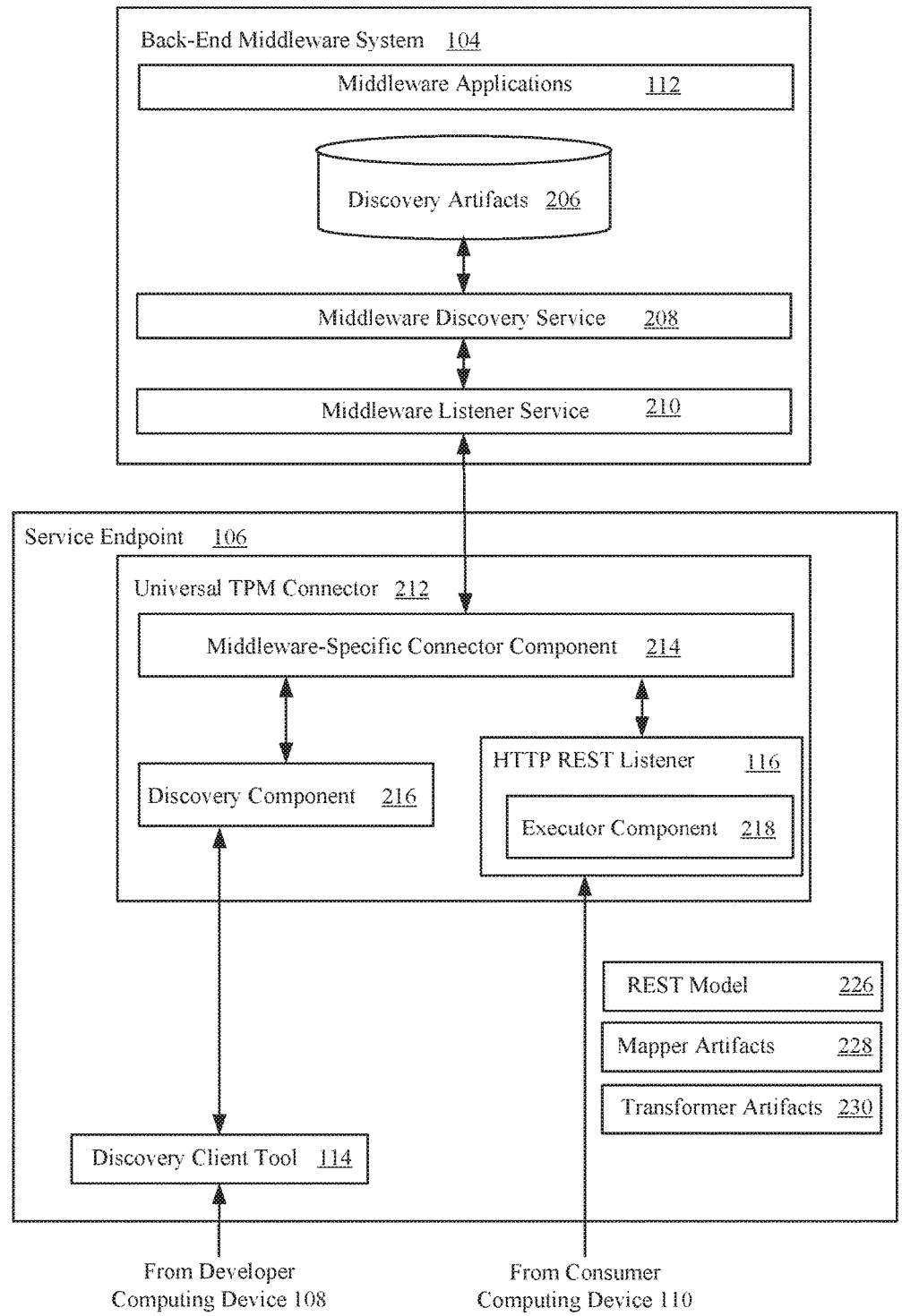
FIG. 2 illustrates a detailed view of a service endpoint and a back-end middleware system, according to one embodiment.

FIG. 2 illustrates a detailed view of the service endpoint 106 and the back-end middleware system 104, according to one embodiment. As shown, the back-end middleware system 104 includes middleware applications 112, middleware discovery service 208, discovery artifacts 206, and middleware listener service 210. Also, the service endpoint 106 includes the HTTP REST listener 116, the discovery client tool 114, and the universal transaction-processing-monitor (TPM) connector 212. The universal TPM connector 212 includes the middleware-specific connector component 214, the discovery component 216, and the executor component 218.

To prepare the middleware applications 112 for REST enablement, the back-end middleware system 104 groups middleware applications 112 according to input/output (I/O) data areas they use. For example, the back-end middleware system 104 can group any of the middleware applications 112 that use a particular I/O data area together under a logical resource name.

Once the middleware applications 112 have been grouped, the back-end middleware system 104 generates the discovery artifacts 206 to describe the middleware applications 112 and the properties of the data areas used by the middleware applications 112. For example, in embodiments where the back-end middleware system 104 is based on a TXSeries middleware platform, the discovery artifacts 206 include structured information such as an applicable resource name and the copybook or structure being used to define a COMMAREA or another type of data area (for CICS style of applications). A COBOL copybook refers to a selection of code that defines data structures (e.g., in a header file that can be included).

The structured information can also include application language information (e.g., the type of programming language used), endianness information (e.g., system endianness of computing systems on which the middleware applications 112 are running), structure data alignment (e.g., copybook or structure data alignment information for COBOL and C applications), and other structured information. "Endianness" refers to the order of the bytes that make up a digital word in computer memory and can also refer to the order of byte transmission over a digital link.

Once the discovery artifacts 206 have been generated, the back-end middleware system 104 activates the middleware discovery service 208 and the middleware listener service 210. When the middleware listener service 210 receives an application-discovery request (e.g., from the developer computing device 108 via the discovery client tool 114 and the universal TPM connector 212 of the service endpoint 106), the middleware listener service 210 forwards the request to the middleware discovery service 208. For example, in some embodiments, the back-end middleware system 104 is based on a TXSeries middleware platform. The IBM TXSeries for multiplatforms is one example type of distributed transaction-processing middleware. In these embodiments, the request may be sent in a type of data area called a communication area (COMMAREA) to the middleware discovery service 208 via a distributed programming link (DPL).

Based on the request, the middleware discovery service 208 retrieves structured information stored in the discovery artifacts 206. The middleware discovery service 208 puts the structured information in a format the discovery component 216 can understand and sends the structured information to the discovery component 216 in a data area in response to the request. For example, in embodiments where the back-end middleware system 104 is based on a TXSeries middleware platform, the middleware discovery service 208 sends the structured information in a COMMAREA.

Upon receiving the structured information sent by the middleware discovery service 208, the discovery component 216 creates a REST model 226 for middleware applications 112 based on the structured information. In addition, the discovery component 216 creates mapper artifacts 228 (e.g., mappings) and transformer artifacts 230. Each of the mapper artifacts 228 maps a RESTful API operation to one or more of the middleware applications 112. Each of the transformer artifacts 230 specifies how to convert JSON data (e.g., received in a RESTful API call) to I/O data that the middleware applications 112 can understand (e.g., in a data area) or vice versa. Once the REST model 226, mapper artifacts 228, and transformer artifacts 230 have been created, the middleware applications 112 are ready to be exposed as services using the HTTP REST listener 116.

When an API call is received at the HTTP REST listener 116, the executor component 218 identifies the REST operation that is being requested by the API call. The executor component 218 compares the REST operation to the mapper artifacts 228 to identify which middleware applications 112 correspond to the REST operation. Next, the executor component 218 identifies which of the transformer artifacts 230 to use to transform JSON data received in the API call to a format the middleware applications 112 can understand and transforms the JSON data accordingly. The executor component 218 then sends a message to the middleware-specific connector component 214 including the transformed data. The message also indicates which of the middleware applications 112 correspond to the REST operation. In one example, the message includes a connection string in the format <middleware_name>, <IP address>, <PORT>, <user_name>, <password>. The "middleware_name" refers to the specific middleware applications 112 to which the REST operation maps, while the Internet protocol (IP) address and PORT specify where to send the message to reach those middleware applications 112. The "user_name" and "password" specify logon credentials.

The middleware-specific connector component 214 sends the message to the back-end middleware system 104, where the middleware applications 112 perform the REST operation using the transformed data. Once the operation has been completed, the back-end middleware system 104 sends a data area containing response information to the middleware-specific connector component 214. The executor component 218 identifies which of the transformer artifacts 230 to use to transform the response information into JSON format and transforms the response information accordingly. Finally, the executor component 218 sends the response information in JSON format and the proper response code in reply to the API call (e.g., to consumer computing device 110).

Figure 3:
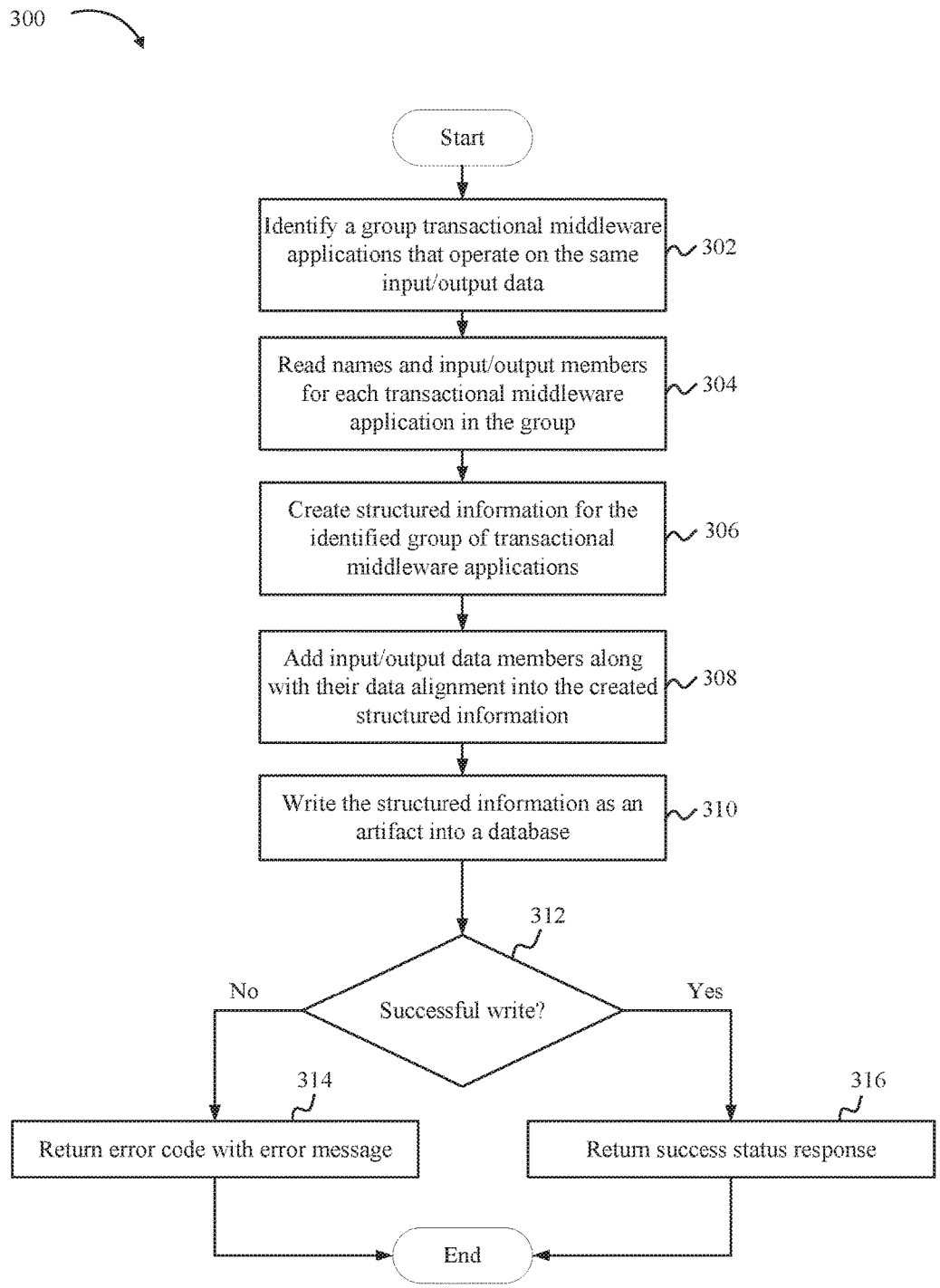
FIG. 3 illustrates a process for preparing transactional middleware applications to be discovered for exposure as RESTful services, according to one embodiment.

FIG. 3 illustrates a process 300 for preparing transactional middleware applications to be discovered for exposure as REST services, according to one embodiment. At step 302, a back-end middleware system identifies a group of transactional middleware applications that operate on the same I/O data area. The back-end middleware system can group the transactional middleware applications together under a logical resource name. At step 304, the back-end middleware system reads names and I/O members for each transactional middleware application in the group.

At step 306, the back-end middleware system creates structured information for the identified group of transactional middleware applications. For example, in embodiments where the back-end middleware system is based on a TXSeries middleware platform, the structured information includes data such as an applicable resource name, the structure or copybook being used as a COMMAREA (for CICS style of applications), application language information (e.g., the type of programming language used), endianness information (e.g., system endianness of computing systems on which the middleware applications 112 are running), and structure data alignment (e.g., structure or copybook data alignment information for COBOL and C applications).

At step 308, the back-end middleware system adds the I/O data members along with their data alignment to the structured information. At step 310, the back-end middleware system writes the structured information as a discovery artifact into a database. At step 312, the back-end middleware system determines whether the structured information was successfully written to the database. If so, the back-end middleware system proceeds to step 316 and returns a success status response. If not, the back-end middleware system proceeds to step 314 and returns an error code with an error message.

Figure 4:
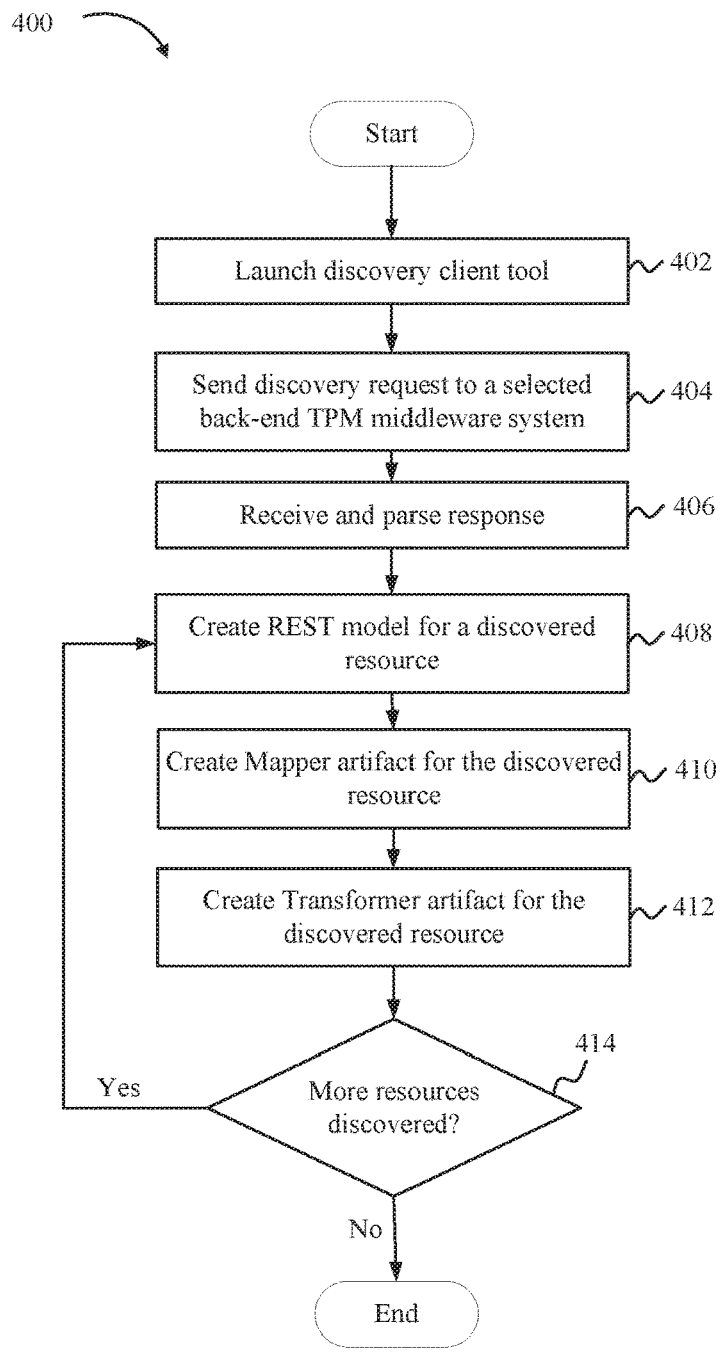
FIG. 4 illustrates a process for a service endpoint discovery client to facilitate exposing transactional middleware applications as RESTful services, according to one embodiment.

FIG. 4 illustrates a process 400 for a service endpoint discovery client to facilitate exposing transactional middleware applications as REST services, according to one embodiment. At step 402, the service endpoint launches a discovery client that provides a user interface for software developers to submit discovery requests. At step 404, the discovery client sends a discovery request (e.g., received from a developer) to a selected back-end TPM middleware system. For example, in embodiments where the back-end TPM middleware system is based on a TXSeries middleware platform, the request may be sent in a COMMAREA to a middleware discovery service of the back-end TPM middleware system via a distributed programming link (DPL).

At step 406, the discovery client receives and parses a response to the discovery request from the back-end TPM system. For example, in embodiments where the back-end TPM middleware system is based on a TXSeries middleware platform, the response is received in a COMMAREA. The response includes structured information for transactional middleware applications that have been logically grouped together. Each group corresponds to a discovered REST resource (i.e., data area).

At step 408, the discovery client creates a REST model for a discovered resource based on the structured information. In addition, at step 410, the discovery client creates a mapper artifact for the discovered resource. The mapper artifact maps a RESTful operation to the transactional middleware applications in the group corresponding to the discovered resource.

At step 412, the discovery client creates a transformer artifact for the discovered resource. The transformer artifact specifies how to convert JSON data (e.g., received in a RESTful API call) to I/O data that the middleware applications in the group corresponding to the discovered resource can understand. Also, the transformer artifact specifies how to convert the I/O data into JSON data. For example, the transform artifact can include a transform stub for converting JSON data to I/O data and a transform stub for converting I/O data to JSON data.

At step 414, the discovery client determines whether any additional REST resources have been discovered. If so, steps 408-412 are repeated for the next resource. Otherwise, the process 400 terminates.

Figure 5:
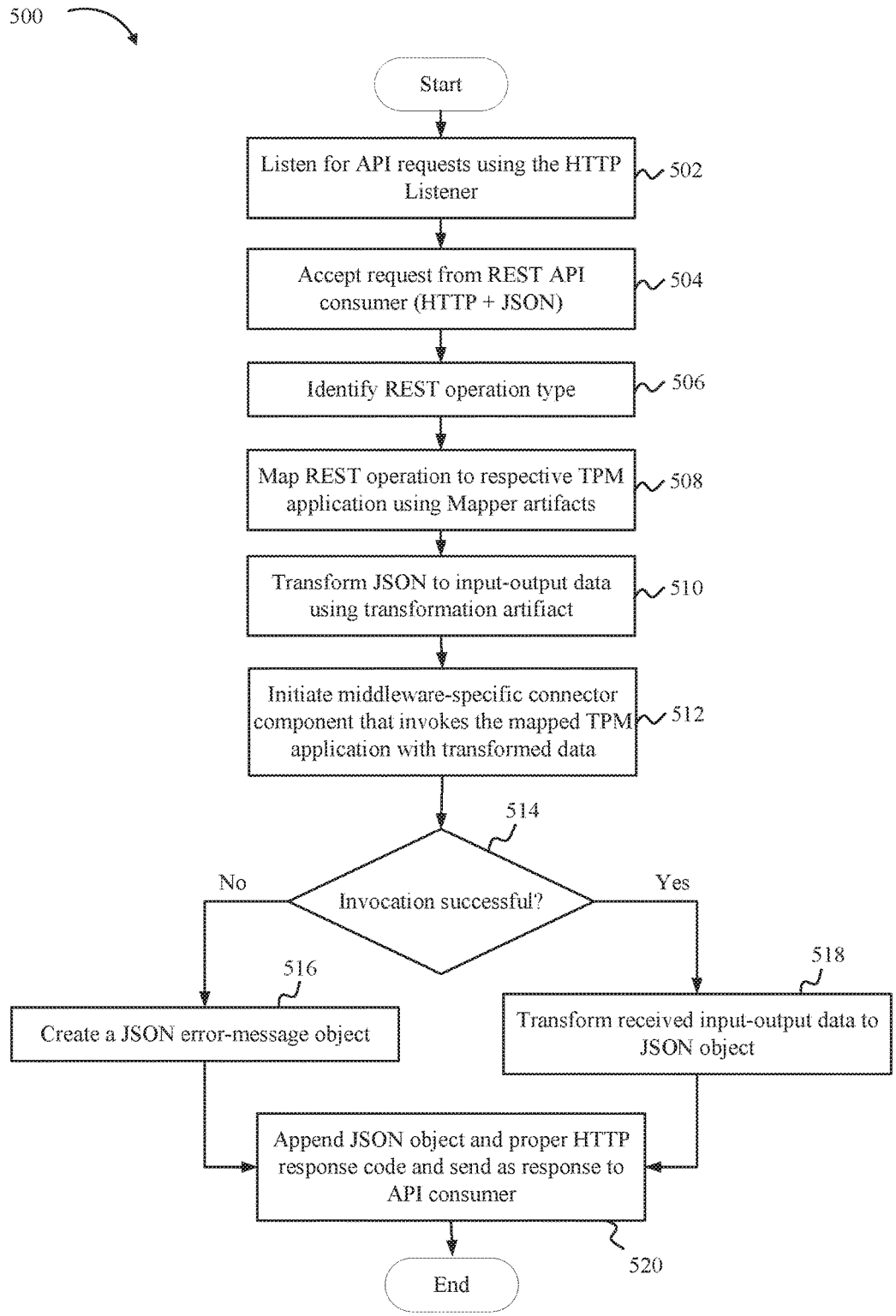
FIG. 5 illustrates a process for exposing transactional middleware applications as RESTful services, according to one embodiment.

FIG. 5 illustrates a process 500 for exposing transactional middleware applications as REST APIs, according to one embodiment. At step 502, a universal TPM connector listens for API requests via an HTTP listener. At step 504, the TPM connector accepts an API request (e.g., an API call) from a REST API consumer. The request includes data in a JSON format.

At step 506, an executor component of the universal TPM connector identifies the REST operation type requested by the API request. At step 508, the executor component maps the REST operation to a TPM application using a mapper artifact that was created during a discovery process (e.g., the process 400 shown in FIG. 4).

At step 510, the executor component transforms the data from JSON format to an I/O format the TPM application can understand using a transformation artifact that was created during a discovery process (e.g., the process 400 shown in FIG. 4). At step 512, the universal TPM connector initiates a middleware-specific connector component that invokes TPM application with the transformed data.

At step 514, the universal TPM connector determines whether the TPM application was invoked successfully. If so, the middleware-specific connector component receives I/O data from the TPM application in response to the invocation. At step 518, the executor component transforms the I/O data into a JSON object using the appropriate transformer artifact. If the invocation was not successful, at step 516, at the executor component creates a JSON error-message object.

At step 514, the executor component appends the JSON object generated in step 518 (or in step 516, if the invocation was unsuccessful) and a proper HTTP response code and sends the JSON object and the response code as a response to the REST API consumer.

Figure 6:
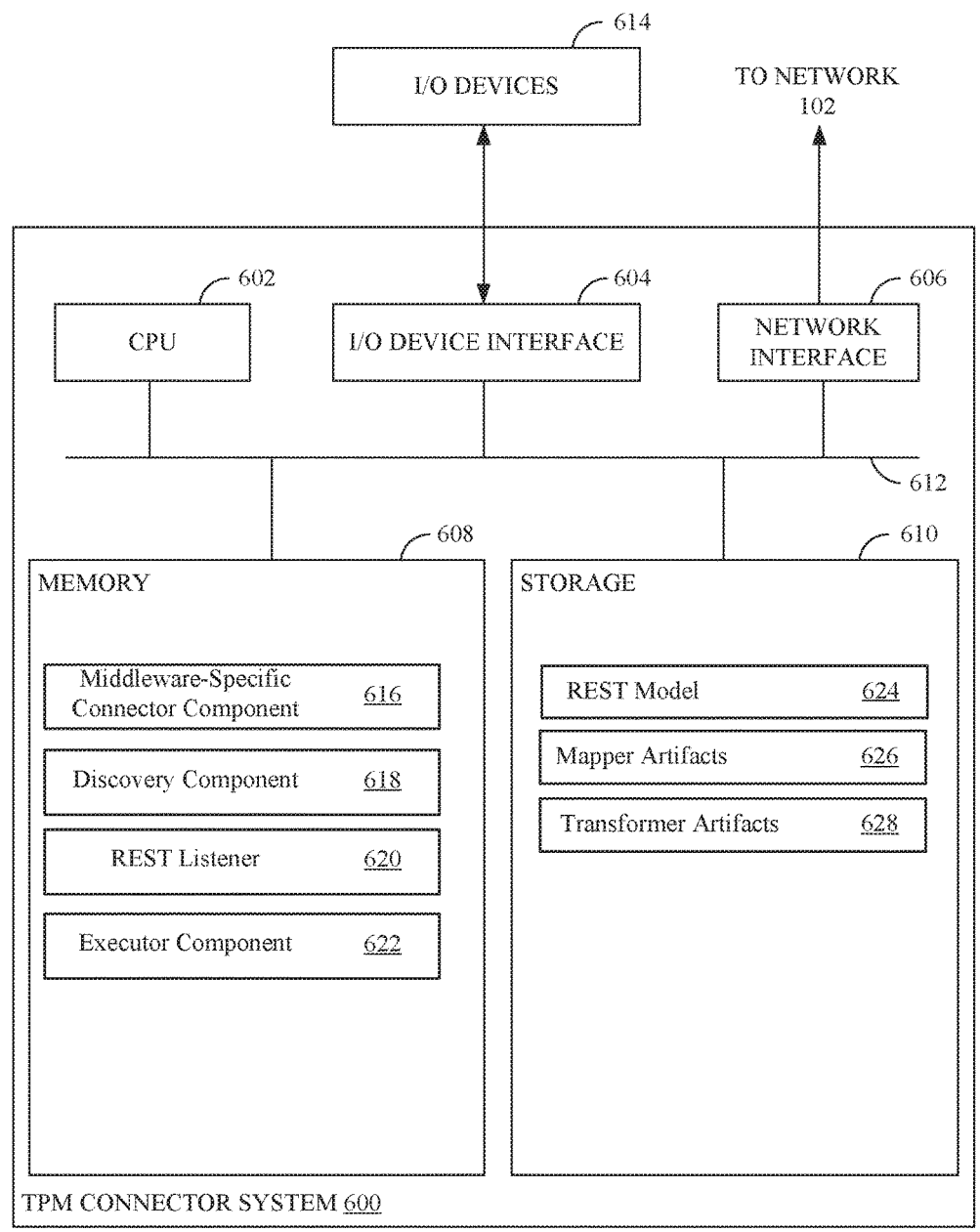
FIG. 6 illustrates an example TPM connector system that exposes transactional middleware as a RESTful interface, according to one embodiment.

FIG. 6 illustrates an example TPM connector system 600 that exposes transactional middleware as a RESTful interface, according to one embodiment. As shown, the TPM connector system 600 includes a central processing unit (CPU) 602, one or more input/output (I/O) device interfaces 604 which may allow for the connection of various I/O devices 614 (e.g., keyboards, displays, mouse devices, pen input, etc.) to the TPM connector system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, the memory 608 represents random access memory. Furthermore, the storage 610 may be a disk drive. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes middleware-specific connector component 616, discovery component 618, REST listener 620, and executor component 622. As shown, storage 610 includes REST model 624, mapper artifacts 626, and transformer artifacts 628.

The discovery component 618 sends a discovery request to discover TPM applications for REST consumption to the middleware-specific connector component 616. The middleware-specific connector component 616 sends the discovery request to a back-end middleware system for processing. In response, the back-end middleware system sends structured information describing TPM applications available in the back-end middleware system.

Upon receiving the structured information, the discovery component 618 creates a REST model 624 for the TPM applications based on the structured information. In addition, the discovery component 618 creates mapper artifacts 626 and transformer artifacts 628.

When an API call is received at the REST listener 620, the executor component 622 identifies a REST operation that is being requested by the API call. The executor component 622 uses the mapper artifacts 626 to identify which TPM application corresponds to the REST operation. Next, the executor component 622 transforms data in the API call from JSON format to a format the TPM application can understand (e.g., a data area) using the transformer artifacts 628. The executor component 622 then sends a message to the middleware-specific connector component 616 including the transformed data. The message also indicates the TPM application corresponding to the REST operation.

The middleware-specific connector component 616 sends the message to the back-end middleware system, where the TPM application performs the REST operation using the transformed data. Once the operation has been completed, the back-end middleware system sends a data area containing response information to the middleware-specific connector component 616. The executor component 622 uses the transformer artifacts 628 to transform the response information into JSON format. Finally, the executor component 622 sends the response information in JSON format and the proper response code in reply to the API call.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of middleware application discovery and exposure as service endpoints, the computer-implemented method comprising:
sending, by a discovery client, a discovery request to a middleware discovery service in order to discover a set of middleware applications of distinct types, the set of middleware applications including a transaction processing monitor (TPM) application, wherein the middleware discovery service is associated with a distributed transaction-processing middleware platform;
receiving, by the discovery client and in response to the discovery request, structured information generated based on a set of discovery artifacts describing the set of middleware applications and further describing properties of an I/O data area on which the middleware applications operate, wherein the I/O data area comprises a communication area, whereafter the structured information is parsed;
generating, based on the parsed structured information and by the discovery client when executed by one or more computer processors: (i) a model for the set of middleware applications, the model specifying the properties of the I/O data area, the model comprising a representational-state-transfer (REST) model; (ii) mappings between one or more operations and middleware applications in the set; and (iii) one or more transformer artifacts indicating how to convert data from a source format incompatible with the I/O data area to a target format compatible with the I/O data area; and
rendering the set of middleware applications accessible by one or more requesting applications via a network, by causing activation of a listener in order to expose the set of middleware applications as service endpoints, whereafter the one or more transformer artifacts are applied in order to facilitate access, by the one or more requesting applications, of the middleware applications via the network.

2. The computer-implemented method of claim 1, further comprising:
receiving, at the listener, an application-programming-interface (API) call;
identifying a REST operation requested by the API call; and
determining, based on the mappings, a subset of the middleware applications to which the REST operation maps.

3. The computer-implemented method of claim 2, further comprising:
transforming input data included in the API call from the source format to the target format by applying the one or more transformer artifacts; and
sending a message including the transformed input data to a middleware listener service for the subset of the middleware applications.

4. The computer-implemented method of claim 1, further comprising:
generating, before sending the discovery request and at a back-end middleware system that includes the middleware discovery service, the set of discovery artifacts that;
storing the discovery artifacts in a data store of the back-end middleware system; and
activating the middleware discovery service.

5. The computer-implemented method of claim 1, wherein the one or more transformer artifacts include a first transformation stub to convert from the source format to the target format and further include a second transformation stub to convert from the target format to the source format.

6. The computer-implemented method of claim 1, wherein the listener comprises a Hypertext Transfer Protocol (HTTP) REST listener, wherein the source format comprises a Javascript-object-notation (JSON) format, wherein the transformer artifacts further indicate how to convert data from the target format to the source format.

7. The computer-implemented method of claim 6, further comprising:
receiving, at the listener, an application-programming-interface (API) call;
identifying a REST operation requested by the API call; and
determining, based on the mappings, a subset of the middleware applications to which the REST operation maps.

8. The computer-implemented method of claim 7, further comprising:
transforming input data included in the API call from the source format to the target format by applying the transformer artifacts; and
sending a message including the transformed input data to a middleware listener service for the subset of the middleware applications.

9. The computer-implemented method of claim 8, further comprising:
receiving, in reply to the message, response data from the subset of the middleware applications, wherein the response data is in the target format; and
transforming the response data from the target format to the source format by applying the one or more transformer artifacts; and
sending the transformed response data in reply to the API call.

10. The computer-implemented method of claim 9, further comprising:
generating, before sending the discovery request and at a back-end middleware system that includes the middleware discovery service, the set of discovery artifacts that;
storing the discovery artifacts in a data store of the back-end middleware system; and
activating the middleware discovery service.

11. The computer-implemented method of claim 10, wherein the discovery artifacts specify each of: a logical-resource name for the set of middleware applications, a copybook, an application programming language in which the middleware applications are written, endianness information of a machine where the middleware applications are executed, and copybook or structure data alignment information;
wherein the one or more transformer artifacts include a first transformation stub to convert from the source format to the target format and further include a second transformation stub to convert from the target format to the source format.

12. A non-transitory computer-readable medium containing instructions executable to perform an operation for middleware application discovery and exposure as service endpoints, the operation comprising:
sending, by a discovery client, a discovery request to a middleware discovery service in order to discover a set of middleware applications of distinct types, the set of middleware applications including a transaction processing monitor (TPM) application, wherein the middleware discovery service is associated with a distributed transaction-processing middleware platform;
receiving, by the discovery client and in response to the discovery request, structured information generated based on a set of discovery artifacts describing the set of middleware applications and further describing properties of an I/O data area on which the middleware applications operate, wherein the I/O data area comprises a communication area, whereafter the structured information is parsed;
generating, based on the parsed structured information and by the discovery client when the instructions are executed by one or more computer processors:
(i) a model for the set of middleware applications, the model specifying the properties of the I/O data area, the model comprising a representational-state-transfer (REST) model;
(ii) mappings between one or more operations and middleware applications in the set; and
(iii) one or more transformer artifacts indicating how to convert data from a source format incompatible with the I/O data area to a target format compatible with the I/O data area; and
rendering the set of middleware applications accessible by one or more requesting applications via a network, by causing activation of a listener in order to expose the set of middleware applications as service endpoints, whereafter the one or more transformer artifacts are applied in order to facilitate access, by the one or more requesting applications, of the middleware applications via the network.

13. The non-transitory computer-readable medium of claim 12, wherein the operation further comprises:
receiving, at the listener, an application-programming-interface (API) call;

identifying a REST operation requested by the API call; and determining, based on the mappings, a subset of the middleware applications to which the REST operation maps.

14. The non-transitory computer-readable medium of claim 13, wherein the operation further comprises:

transforming input data included in the API call from the source format to the target format by applying the one or more transformer artifacts; and sending a message including the transformed input data to a middleware listener service for the subset of the middleware applications.

15. The non-transitory computer-readable medium of claim 12, wherein the operation further comprises:

generating, before sending the discovery request and at a back-end middleware system that includes the middleware discovery service, the set of discovery artifacts that;

storing the discovery artifacts in a data store of the back-end middleware system; and activating the middleware discovery service.

16. The non-transitory computer-readable medium of claim 12, wherein the one or more transformer artifacts include a first transformation stub to convert from the source format to the target format and further include a second transformation stub to convert from the target format to the source format.

17. A system of middleware application discovery and exposure as service endpoints, the system comprising:

one or more computer processors; and a memory storing one or more applications that, when executed on the one or more computer processors, perform an operation comprising:

sending, by a discovery client, a discovery request to a middleware discovery service in order to discover a set of middleware applications of distinct types, the set of middleware applications including a transaction processing monitor (TPM) application, wherein the middleware discovery service is associated with a distributed transaction-processing middleware platform;

receiving, by the discovery client and in response to the discovery request, structured information generated based on a set of discovery artifacts describing the set of middleware applications and further describing properties of an I/O data area on which the middleware applications operate, wherein the I/O data area comprises a communication area, whereafter the structured information is parsed;

generating, by the discovery client and based on the parsed structured information:

(i) a model for the set of middleware applications, the model specifying the properties of the I/O data area, the model comprising a representational-state-transfer (REST) model;

(ii) mappings between one or more operations and middleware applications in the set; and (iii) one or more transformer artifacts indicating how to convert data from a source format incompatible with the I/O data area to a target format compatible with the I/O data area; and rendering the set of middleware applications accessible by one or more requesting applications via a network, by causing activation of a listener in order to expose the set of middleware applications as service endpoints, whereafter the one or more transformer artifacts are applied in order to facilitate access, by the one or more requesting applications, of the middleware applications via the network.

18. The system of claim 17, wherein the operation further comprises:

receiving, at the listener, an application-programming-interface (API) call;

identifying a representational-state-transfer (REST) operation requested by the API call; and determining, based on the mappings, a subset of the middleware applications to which the REST operation maps.

19. The system of claim 18, wherein the operation further comprises:

transforming input data included in the API call from the source format to the target format by applying the one or more transformer artifacts; and sending a message including the transformed input data to a middleware listener service for the subset of the middleware applications.

20. The system of claim 17, wherein the operation further comprises:

generating, before sending the discovery request and at a back-end middleware system that includes the middleware discovery service, the set of discovery artifacts;

storing the discovery artifacts in a data store of the back-end middleware system; and activating the middleware discovery service.

* * * * *